(12) United States Patent
Shiraki (10) Patent No.: US 8,668,180 B2
(45) Date of Patent: Mar. 11, 2014

(54) SEAT SLIDE DEVICE

(75) Inventor: Shin Shiraki, Kakamigahara (JP)

(73) Assignee: Gifu Auto Body Co., Ltd. (JP)

( * ) Notice: Subject to any disclaimer, the term of this patent is extended or adjusted under 35 U.S.C. 154(b) by 31 days.

(21) Appl. No.: 13/534,676

(22) Filed: Jun. 27, 2012

(65) Prior Publication Data

US 2013/0015312 A1    Jan. 17, 2013

(30) Foreign Application Priority Data

Jul. 13, 2011    (JP) ................................. 2011-154988

(51) Int. Cl.
*F16M 13/00*    (2006.01)

(52) U.S. Cl.
USPC .......... 248/429; 248/424; 296/65.13; 297/311

(58) Field of Classification Search
USPC ..................... 248/429, 430, 424, 419, 423; 296/65.01, 65.11, 65.13; 297/311, 314, 297/331, 332
See application file for complete search history.

(56) References Cited

U.S. PATENT DOCUMENTS

| | | | |
|---|---|---|---|
| 5,348,261 A | 9/1994 | Nini | |
| 7,066,521 B2 * | 6/2006 | Jung et al. ................... | 296/65.13 |
| 8,146,877 B2 * | 4/2012 | Rohee et al. ................... | 248/429 |
| 2003/0085330 A1 * | 5/2003 | Lee ................ | 248/430 |

FOREIGN PATENT DOCUMENTS

| | | |
|---|---|---|
| JP | 10-100752 A | 4/1998 |
| JP | 10315810 | 12/1998 |
| JP | 2002-160555 A | 6/2002 |
| JP | 2002-283888 A | 10/2002 |
| JP | 2011-079370 A | 4/2011 |

OTHER PUBLICATIONS

International Search Report for PCT/JP2012/006185 mailed Jun. 7, 2013.
Japanese Office Action dated Jun. 25, 2013 for JP 2011-154988.

* cited by examiner

*Primary Examiner* — Alfred J Wujciak
(74) *Attorney, Agent, or Firm* — Caesar, Rivise, Bernstein, Cohen & Pokotilow, Ltd.

(57) ABSTRACT

A seat slide device is switchable between a locked state and an unlocked state. When the seat slide device in the locked state, a lock member attached to an upper rail is engaged with a lock hole formed in a lower rail. This restricts movement of the upper rail with respect to the lower rail. When the seat slide device is in the unlocked state, the lock member is separated from the lock hole to permit the upper rail to move with respect to the lower rail. In the unlocked state, a gap is formed between a movable portion and the lower rail. In contrast, in the locked state, the movable portion contacts the lower rail and the gap between the movable portion and the lower rail is eliminated.

5 Claims, 8 Drawing Sheets

SEAT SLIDE DEVICE

BACKGROUND OF THE INVENTION

The present invention relates to a seat slide device for a vehicle and, more particularly, a structure for movably supporting an upper rail with respect to a lower rail.

Japanese Laid-Open Patent Publication No. 10-315810 discloses a seat slide device for a vehicle. In the device, a slider having a plastic projection is attached to an upper rail. The upper rail elastically presses the slider against a lower rail when moving. This prevents rattling of the upper rail with respect to the lower rail when the upper rail moves.

However, in the device described in the aforementioned document, the plastic projection is constantly pressed against the lower rail. As a result, even if the upper rail is unlocked from the lower rail, resistance to movement of the upper rail may easily occur. Also, errors in dimensional accuracy may occur between the lower rail and the upper rail. In this case, elastic force produced by the plastic projection changes easily and thus increases the resistance to movement of the upper rail to an excessive extent. This can hamper operation for moving the upper rail. Further, when the upper rail is locked with respect to the lower rail, errors in dimensional accuracy between the upper rail and the lower rail may cause the plastic projection to contact or separate from the lower rail. As a result, the upper rail is likely to rattle with respect to the lower rail.

SUMMARY OF THE INVENTION

Accordingly, it is an objective of the present invention to provide a seat slide device that decreases resistance to movement of an upper rail when the upper rail is unlocked from a lower rail and prevents rattling of the upper rail with respect to the lower rail when the upper rail is locked, even if there is an error in dimensional accuracy between the lower rail and the upper rail.

To achieve the foregoing objective and in accordance with one aspect of the present invention, a seat slide device is provided that includes a lower rail fixed to a floor, an upper rail fixed to a seat and supported to be movable with respect to the lower rail, a plurality of lock portions formed in the lower rail and arranged in a movement direction of the upper rail, a lock member attached to the upper rail, a movable portion provided in the upper rail, and an interlocking mechanism. The seat slide device is switchable between a locked state, in which the lock member is engaged with the lock portions to restrict movement of the upper rail with respect to the lower rail, and an unlocked state, in which the lock member is separated from the lock portions to permit the movement of the upper rail with respect to the lower rail. The movable portion selectively approaches and separates from a guiding portion in the lower rail. The interlocking mechanism transmits movement of the lock member as movement of the movable portion. In the unlocked state, the movable portion becomes separated from the guiding portion. In the locked state, the movable portion approaches the guiding portion to decrease a gap between the movable portion and the guiding portion compared to the gap in the unlocked state. The interlocking mechanism includes a slider provided in the upper rail and a guide provided in the upper rail. The slider reciprocates in a front-rear direction, in which the upper rail moves with respect to the lower rail. The guide causes a movable portion provided in the slider to separate from the guiding portion or approach the guiding portion through movement of the slider. The interlocking mechanism moves the movable portion by transmitting movement of the lock member to the movable portion through the slider.

DETAILED DESCRIPTION OF THE PREFERRED EMBODIMENT

A seat slide device according to a first embodiment of the present invention will now be described with reference to FIGS. 1A to 6B. In the description, a front-rear direction X, a left-right direction Y, and an up-down direction Z are defined as indicated by arrows in FIGS. 1A to 2B.

Figure 1A:
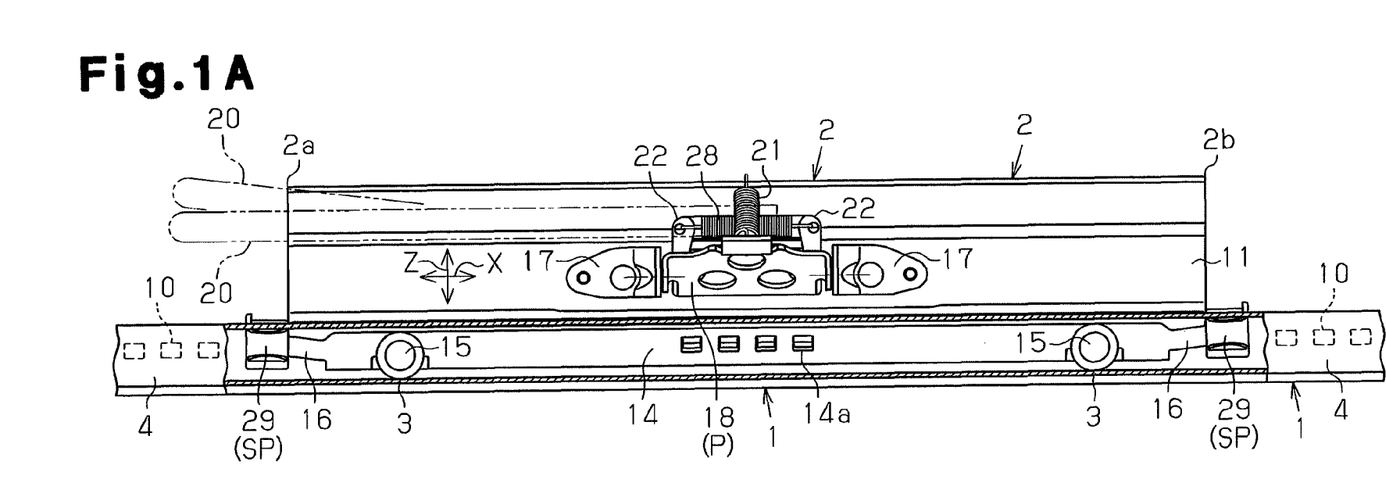
FIG. 1A is a front view showing a locked state of a seat slide device according to a first embodiment of the present invention.
Figure 1B:
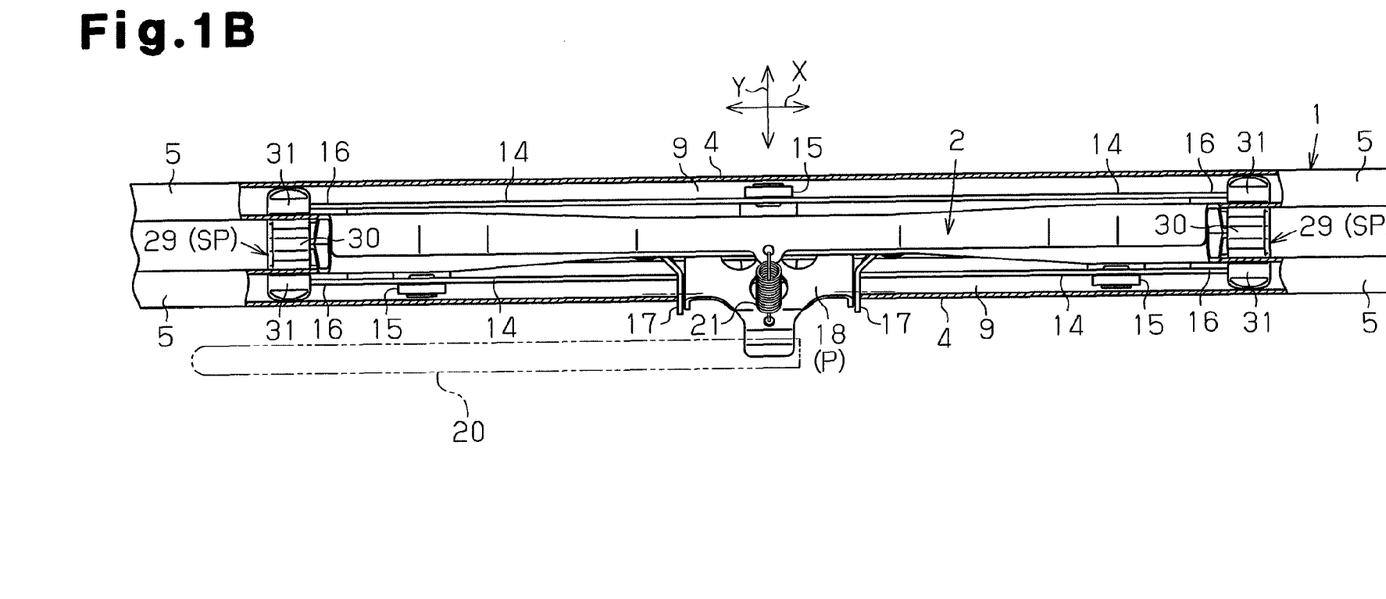
FIG. 1B is a plan view showing the locked state of the seat slide device.

As illustrated in FIGS. 1A and 1B, a pair of left and right lower rails 1 are fixed to the floor (not shown) of a vehicle. The lower rails 1 each extend in the front-rear direction X. A pair of upper rails 2 is fixed to left and right side portions of a seat (not shown). The upper rails 2 are each received in the corresponding lower rail 1 and supported movably in the front-rear direction X.

With reference to FIGS. 3A to 4B, the lower rails 1 each include a bottom plate portion 3, a pair of side plate portions 4, a pair of top plate portions 5, and a pair of dead plate portions 6. The side plate portions 4 correspond to the portions curved and extended upward from the left and right ends of the bottom plate portion 3. The top plate portions 5 correspond to the portions curved and extended inward from the top ends of the left and right side plate portions 4. The dead plate portions 6 correspond to the portions curved and extended downward from the left and right top plate portions 5. The space surrounded by the bottom plate portion 3, the left and right side plate portions 4, the left and right top plate portions 5, and the left and right dead plate portions 6 is formed as an accommodation chamber 7.

The accommodation chamber 7 has upward openings 8 and grooves 9, which are located below the corresponding openings 8. The openings 8 are arranged between the opposite dead plate portions 6 and extend in the front-rear direction X. Each of the grooves 9 is formed between the corresponding one of the side plate portions 4 and the associated dead plate portion 6 and extends in the front-rear direction X. One of the two dead plate portions 6 has a plurality of lock holes 10 each serving as a lock portion. The lock holes 10 are arranged in a predetermined zone of the dead plate portion 6, spaced apart at predetermined intervals, and aligned in the front-rear direction X.

Each of the upper rails 2 is configured by a pair of side plates 11, which are overlapped with each other. Each of the side plates 11 extends between a front end 2a and a rear end 2b of the upper rail 2 in the front-rear direction X, as illustrated in FIGS. 1A and 1B. A lower portion of each side plate 11 is received in the accommodation chamber 7 of the lower rail 1. In the lower portions of the side plates 11, a pair of left and right guide plate portions 13 and a pair of arm plate portions 14 are formed. Each of the arm plate portions 14 is curved and extended upward from the lower end of the corresponding one of the guide plate portions 13. The two guide plate portions 13 are inserted in the corresponding openings 8 and form a sliding groove 12 by increasing the interval between the guide plate portions 13 in the left-right direction Y. The arm plate portions 14 are received in the corresponding left and right grooves 9.

Figure 3A:
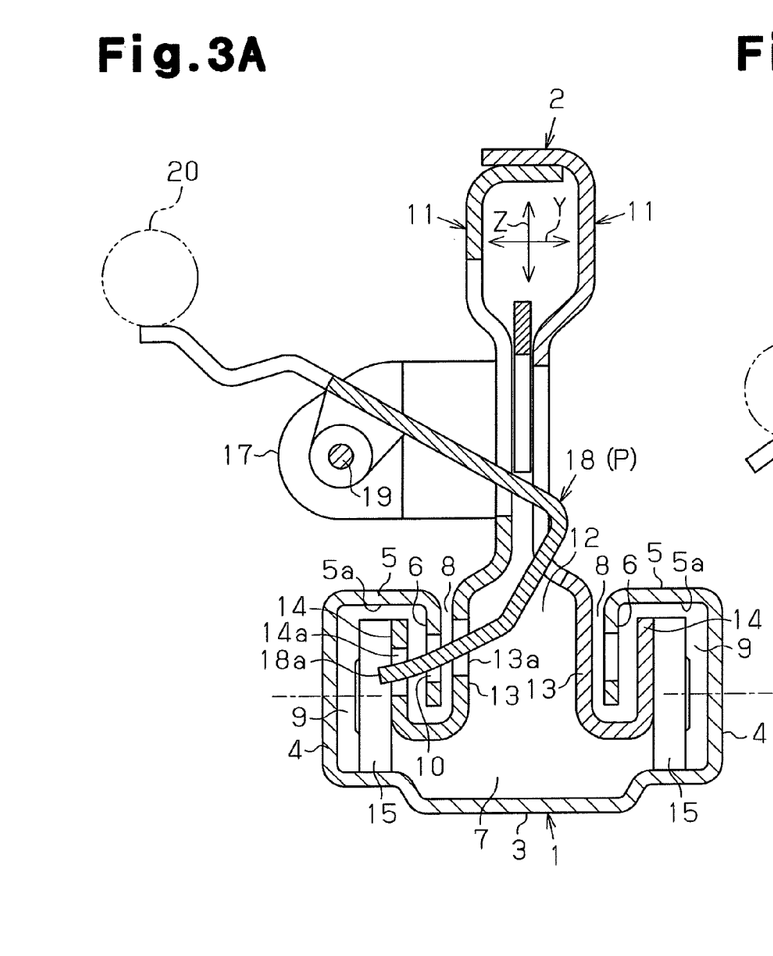
FIG. 3A is an enlarged transverse cross-sectional view showing the vicinity of a lock member in the locked state.
Figure 3B:
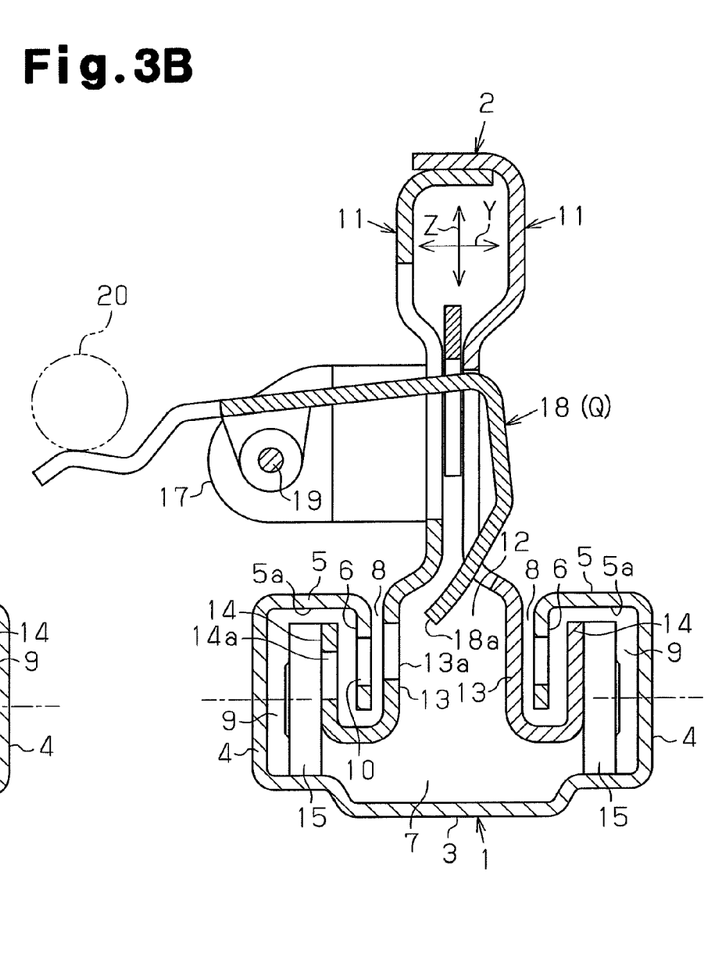
FIG. 3B is an enlarged transverse cross-sectional view showing the vicinity of the lock member in the unlocked state.

Each of the arm plate portions 14 supports a roller 15. The rollers 15 are mounted on the bottom plate portion 3 of the lower rail 1. As illustrated in FIGS. 1A and 1B, a guide 16 extending in the front-rear direction X is formed at each of the opposite ends of each of the arm plate portions 14. With reference to FIGS. 5A to 6B, a restriction surface 16a is formed on each of the guides 16 and inclined upward in the front-rear direction X. Referring to FIGS. 3A and 3B, an upper portion of each side plate 11 projects upward from the corresponding opening 8 of the lower rail 1.

As shown in FIGS. 1A to 3B, each upper rail 2 has brackets 17, which are formed at a middle position in the front-rear direction X. The brackets 17 are attached to one of the two side plates 11, which are components of the upper rail 2. A lock member 18 is supported by the brackets 17 in a manner rotational about a support shaft 19. The lock member 18 includes a plurality of lock claws (lock portions) 18a. A handle 20 is joined to the lock member 18.

The opposite ends of a tension coil spring 21 are hooked to the upper rail 2 and the lock member 18. A plurality of escape holes 13a are formed in one of the guide plate portions 13, which are components of the upper rail 2, in correspondence with the lock holes 10 in the dead plate portion 6. Also, a plurality of escape holes 14a are formed in one of the arm plate portions 14, which are components of the upper rail 2, in correspondence with the lock holes 10.

As illustrated in FIGS. 1A, 1B, and 3A, in a locked state P, the lock member 18, together with the handle 20, is urged by the tension coil spring 21. In this state, the lock member 18 is rotated clockwise about the support shaft 19 as viewed in FIG. 3A such that the lock claws 18a are engaged with the lock holes 10 of the lower rail 1 and the escape holes 13a, 14a of the upper rail 2. As a result, the locked state P restricts movement of the upper rail 2 with respect to the lower rail 1 in the front-rear direction X.

FIG. 3B illustrates a state in which the handle 20 is lowered against the urging force of the tension coil spring 21 from the lock state P. In the state in FIG. 3B, the lock member 18 is rotated counterclockwise about the support shaft 19 as viewed in FIG. 3B such that the lock claws 18a are disengaged from the lock holes 10 of the lower rail 1 and the escape holes 13a, 14a of the upper rail 2. This switches the locked state P illustrated in FIG. 3A to an unlocked state Q, which is illustrated in FIG. 3B. In the unlocked state Q, the upper rail 2 is permitted to move with respect to the lower rail 1 in the front-rear direction X.

Figure 2A:
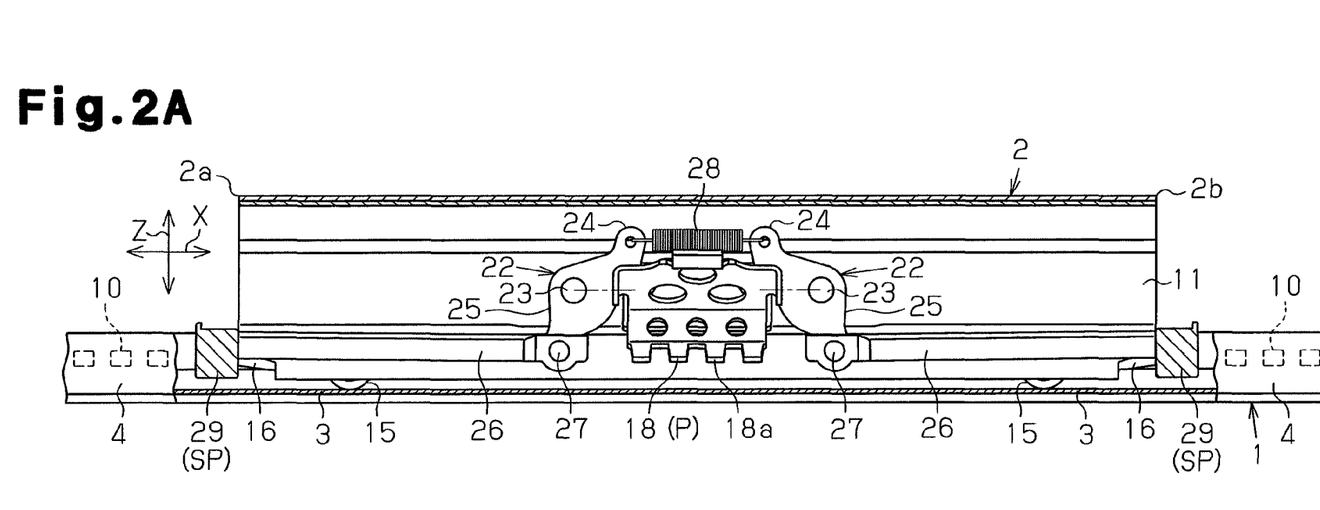
FIG. 2A is a front view showing the locked state of the seat slide device as viewed from a position different from the position corresponding to FIG. 1A.
Figure 2B:
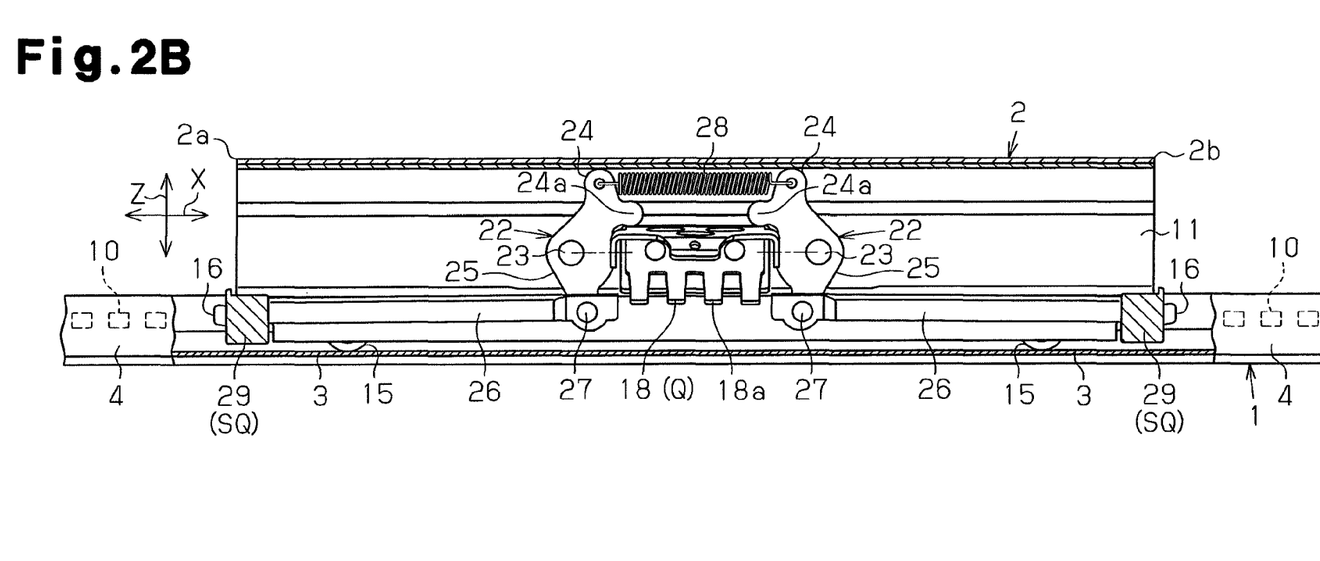
FIG. 2B is a front view showing an unlocked state of the seat slide device.

With reference to FIGS. 2A and 2B, each upper rail 2 has a pair of levers 22, which serve as part of an interlocking means and which are formed at the opposite sides of the lock member 18. Each of the levers 22 is supported in a manner rotational about a support shaft 23 with respect to the upper rail 2. Each lever 22 has an upper arm portion 24 extending upward from the support shaft 23 and a lower arm portion 25 extending downward from the support shaft 23. A transmitting portion 24a, which is engaged with the lock member 18, is formed in each of the upper arm portions 24. Each of the transmitting portions 24a is engaged with the lock member 18 to transmit rotation of the lock member 18 as rotation of the lever 22.

Sliders 26, each of which serves as part of the interlocking means, are received in the sliding groove 12. The sliders 26 reciprocate with respect to the upper rail 2 in the front-rear direction X. The proximal end of each of the sliders 26 is connected to the lower arm portion 25 of the corresponding one of the levers 22 through a support shaft 27. Two ends of a tension coil spring 28 are connected to the upper arm portions 24 of the corresponding levers 22. Movable portions 29, each of which is formed of plastic, are formed at outer ends of the sliders 26. Each of the movable portions 29 projects outward from the sliding groove 12.

Figure 5A:
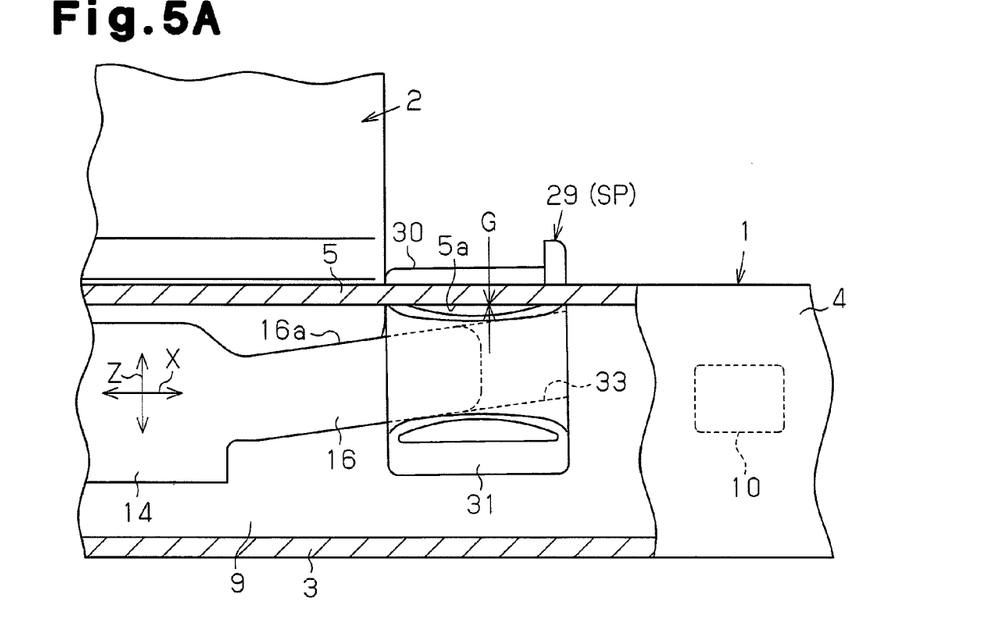
FIG. 5A is an enlarged front view showing the vicinity of the movable portion in the locked state.
Figure 5B:
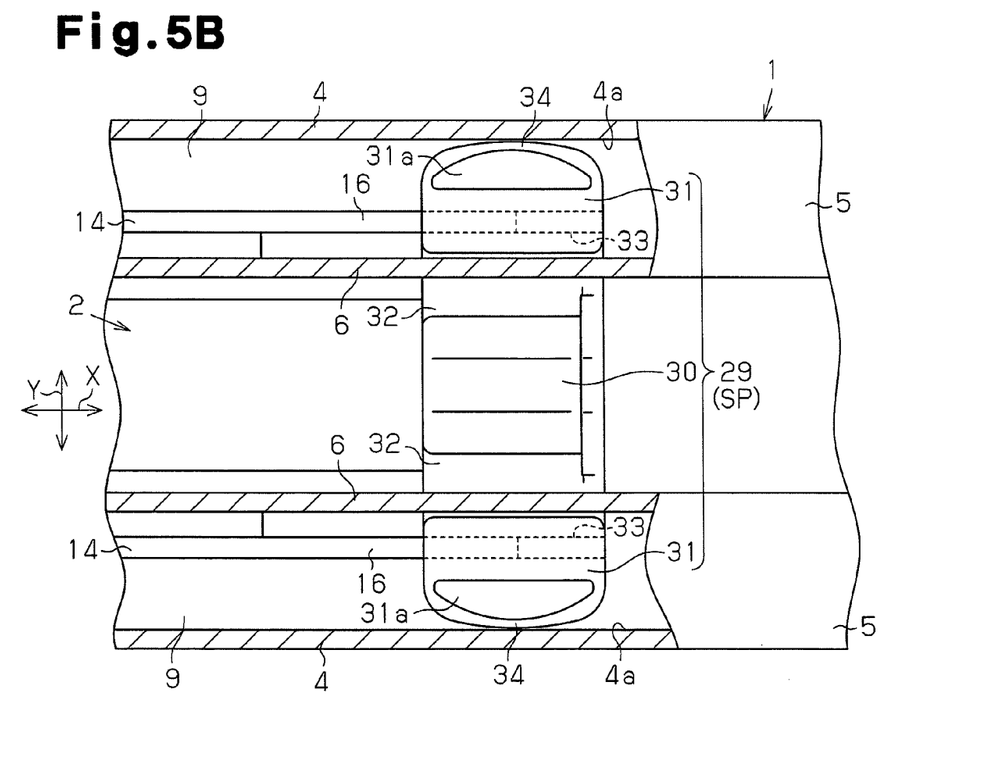
FIG. 5B is an enlarged plan view showing the vicinity of the movable portion in the locked state.
Figure 6A:
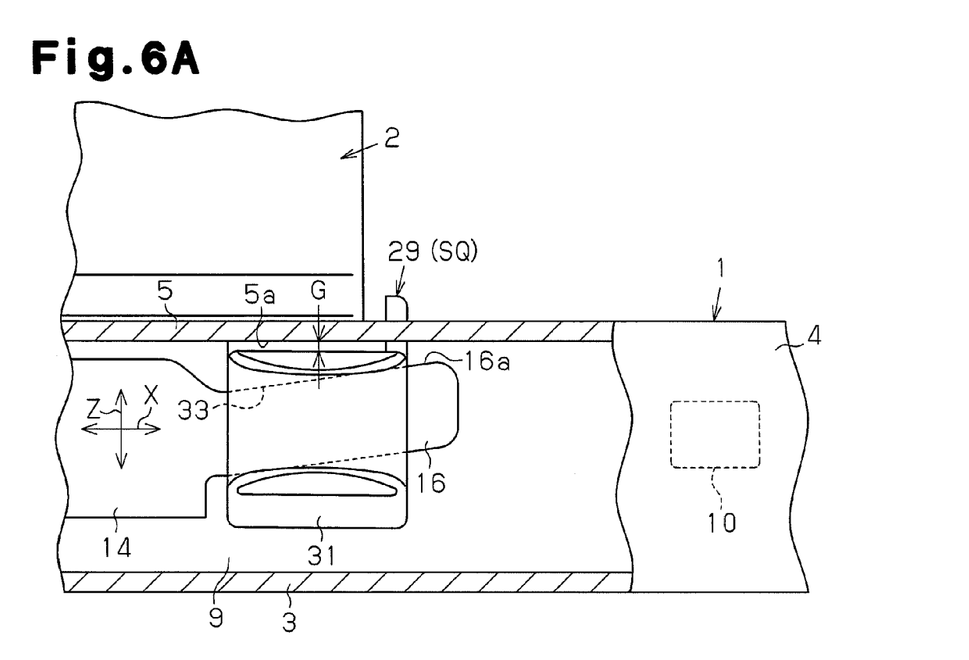
FIG. 6A is an enlarged front view showing the vicinity of the movable portion in the unlocked state.
Figure 6B:
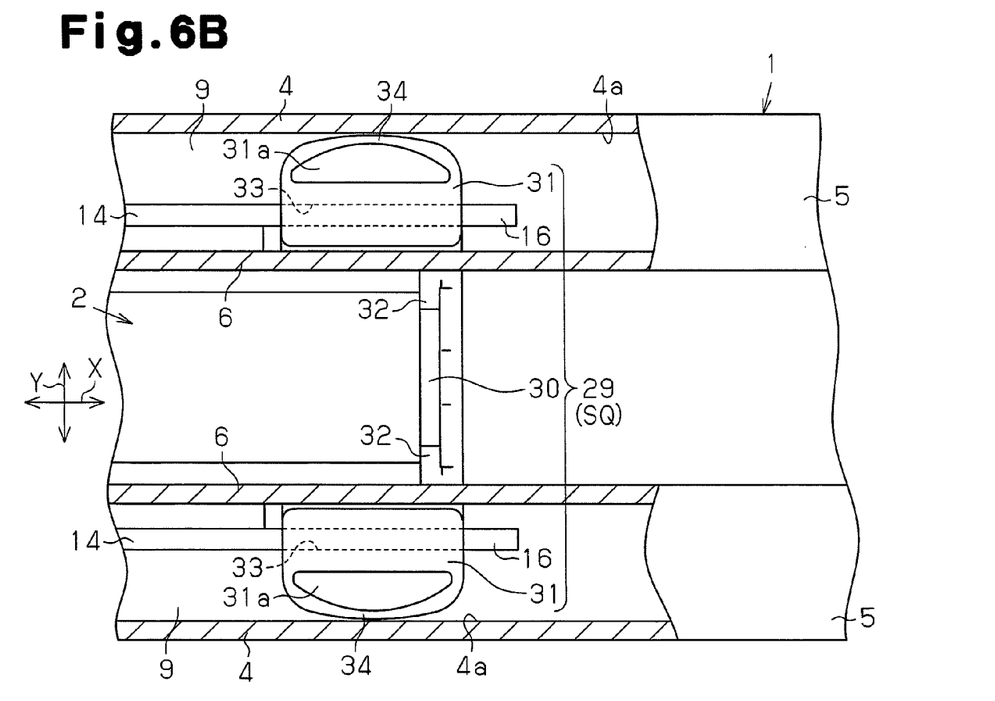
FIG. 6B is an enlarged plan view showing the vicinity of the movable portion in the unlocked state.
Figure 7A:
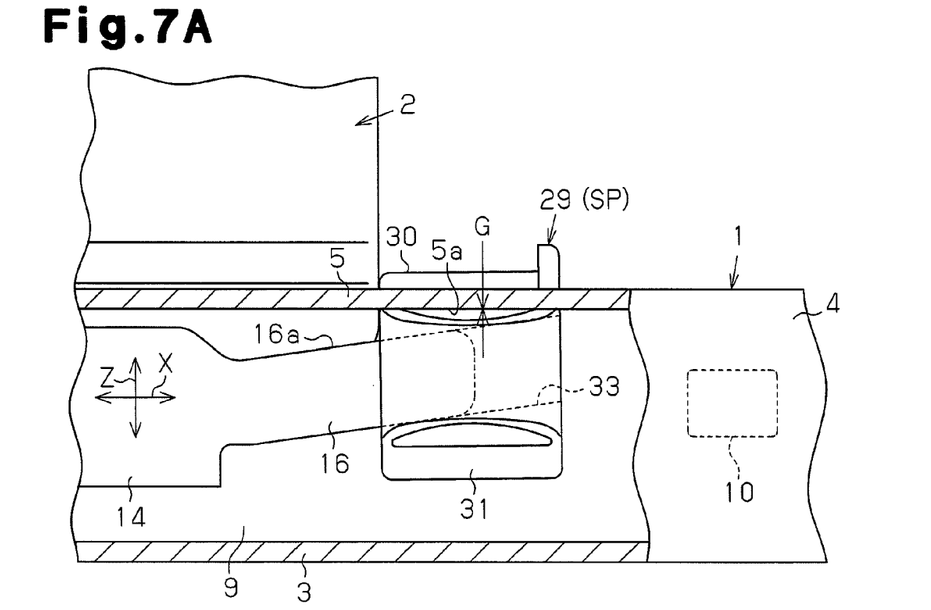
FIG. 7A is an enlarged front view showing the vicinity of a movable portion in a seat slide device according to a second embodiment of the invention when the device is in a locked state.
Figure 7B:
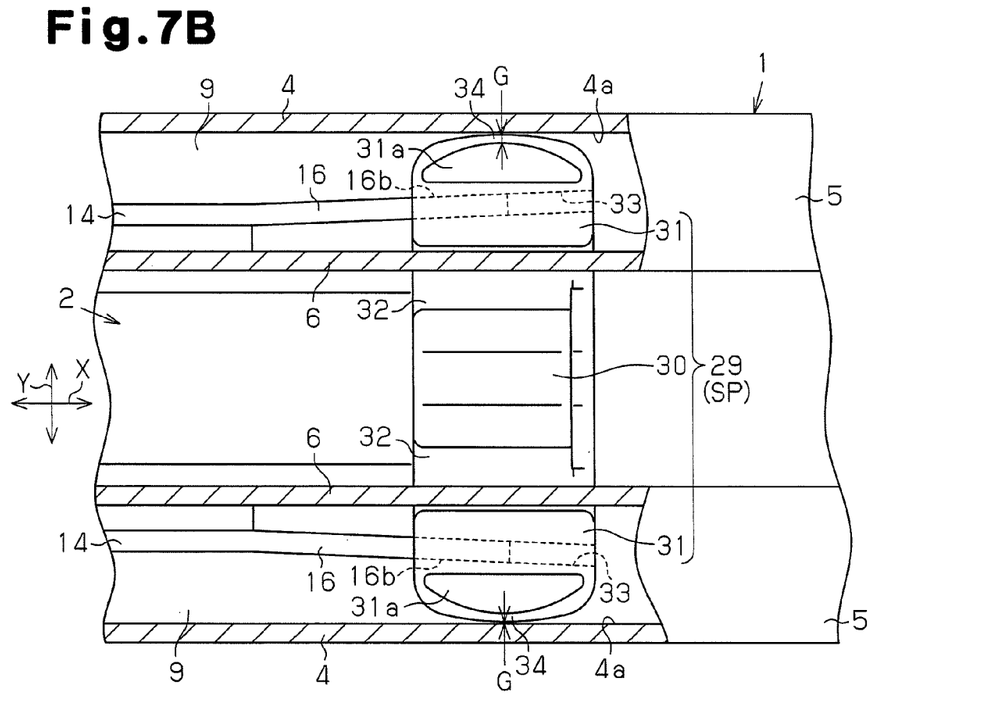
FIG. 7B is an enlarged plan view showing the vicinity of the movable portion in the locked state.
Figure 8A:
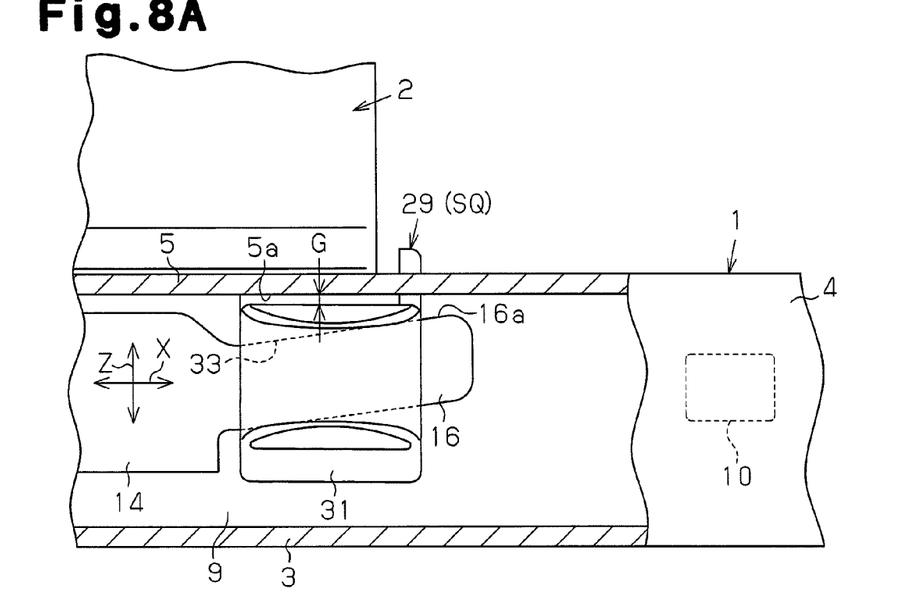
FIG. 8A is an enlarged front view showing the vicinity of the movable portion in an unlocked state.
Figure 8B:
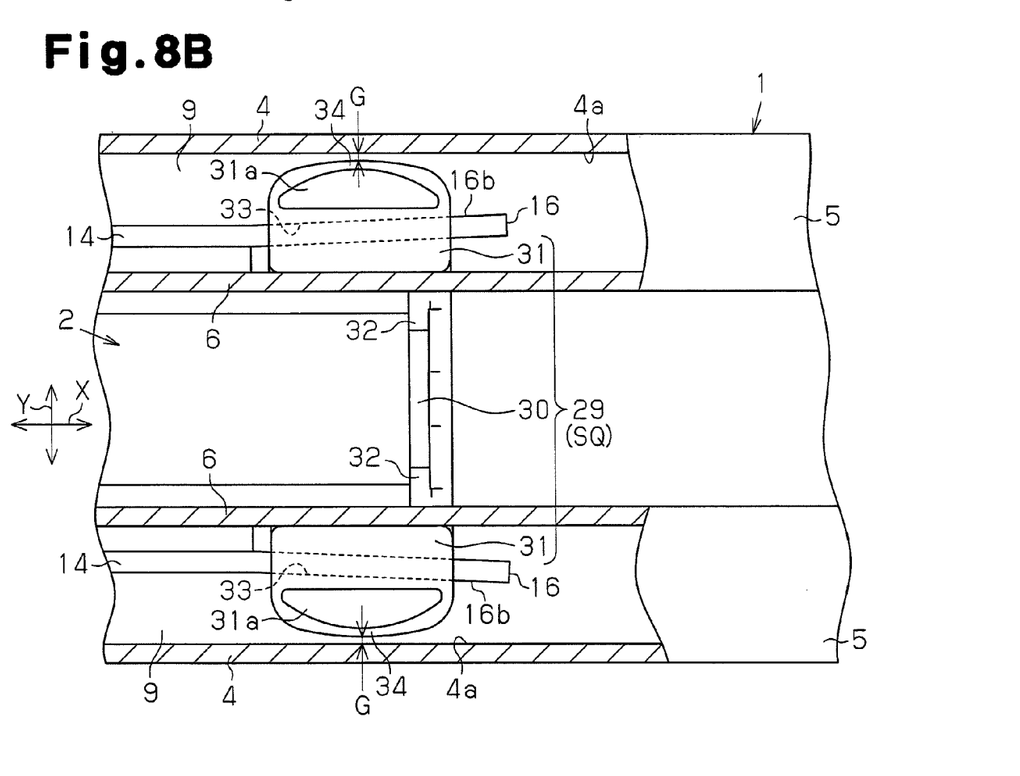
FIG. 8B is an enlarged plan view showing the vicinity of the movable portion in the unlocked state.

With reference to FIGS. 5B and 6B, each movable portion 29 includes a middle portion 30 and a pair of contact portions 31, which project from the middle portion 30 in the left-right direction Y. A passage 32, through which the corresponding dead plate portion 6 of the lower rail 1 is passed, is formed between the middle portion 30 and each of the contact portions 31. Each contact portion 31 has a restriction hole 33 through which the corresponding guide 16, which is part of the corresponding interlocking means, is inserted. The restriction holes 33 extend in the front-rear direction X. Each contact portion 31 has a wall portion 34, which faces an inner surface 4a (a guiding portion) of the corresponding side plate portion 4, which is a component of the lower rail 1. A clearance 31a, which opens in the up-down direction Z, is formed at the inner side of the wall portion 34.

Figure 4A:
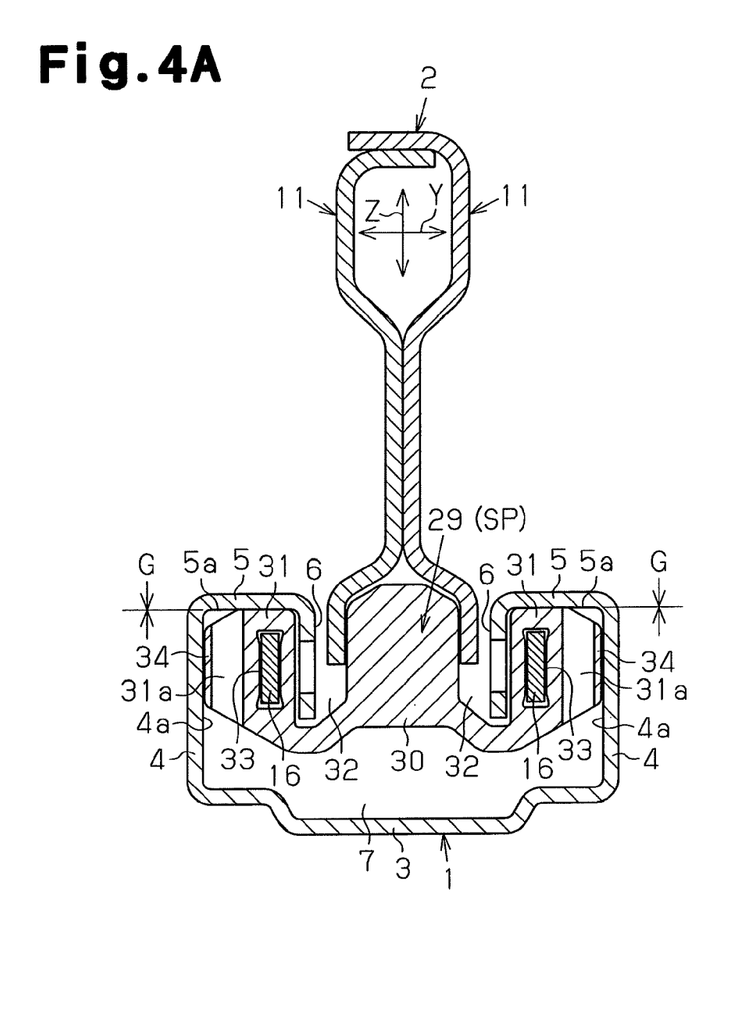
FIG. 4A is an enlarged transverse cross-sectional view showing the vicinity of a movable portion in the locked state.
Figure 4B:
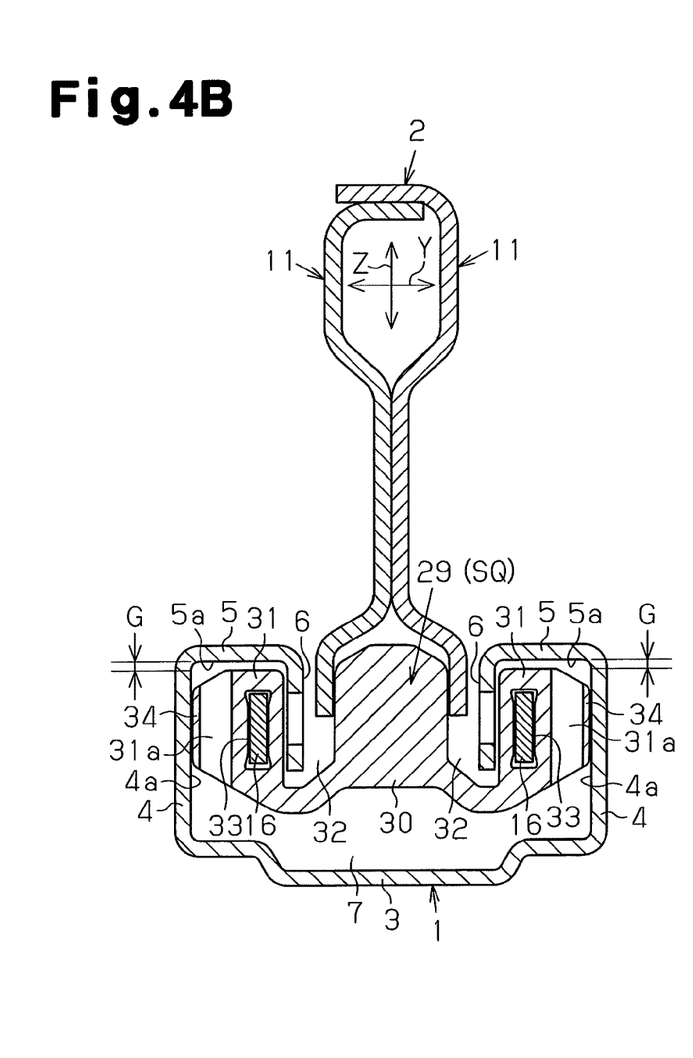
FIG. 4B is an enlarged transverse cross-sectional view showing the vicinity of the movable portion in the unlocked state.

As illustrated in FIG. 2A, when the lock member 18 is in the locked state P, the transmitting portion 24a of each lever 22 is separated from the lock member 18. In this state, the urging force of the tension coil spring 28 rotates the levers 22 about the associated support shafts 23 such that movable portions 29, each of which is located at the front end or the rear end of the corresponding slider 26, project outward from the sliding groove 12 of the upper rail 2. This causes the restriction surface 16a of each guide 16 to raise the inner surface of the restriction hole 33 in the corresponding contact portion 31 of the movable portion 29, as illustrated in FIGS. 4A and 5A. The contact portion 31 of the movable portion 29 thus approaches and contacts an inner surface 5a (a guiding portion) of the corresponding top plate 5, which is a component of the lower rail 1, such that the gap G between the inner surface 5a and the contact portion 31 is eliminated (an approaching state SP). In other words, in the locked stated P, each contact portion 31 of the movable portion 29 is pressed against the inner surface 5a of the corresponding top plate portion 5.

With reference to FIG. 2B, when the lock member 18 is in the unlocked state Q, the lock member 18 raises the transmitting portions 24a of the two levers 22 against the urging force of the tension coil spring 28. This rotates each lever 22 about the associated support shaft 23 such that the movable portions 29, each of which is located at the front end or the rear end of the corresponding slider 26, are received in the sliding groove 12 of the upper rail 2. As a result, with reference to FIGS. 4B and 6A, the restriction surface 16a of each guide 16 is prevented from raising the inner surface of the restriction hole 33 of each contact portion 31. In other words, each movable portion 29 moves downward along the associated guide 16 to separate the contact portion 31 from the inner surface 5a of the top plate portion 5, such that the gap G is regenerated between the inner surface 5a and the contact portion 31 (a separated state SQ). As a result, in the unlocked state Q, with reference to FIGS. 6A and 6B, each contact portion 31 is in slight contact with an inner surface 4a of the lower rail 1 and separated from the inner surface 5a of the corresponding top plate portion 5. This allows the upper rail 2 to move with respect to the lower rail 1 in the front-rear direction X.

A seat slide device of a second embodiment according to the present invention will hereafter be described with reference to FIGS. 7A to 8B. Detailed description is omitted herein for components of the second embodiment that are the same as or like corresponding components of the first embodiment.

With reference to FIGS. 7A to 8B, each guide 16 has a restriction surface 16b, which faces the inner surface 4a of the corresponding side plate portion 4. The restriction surface 16b is inclined outward in the front-rear direction X. Each contact portion 31 is slightly flexible in the left-right direction Y. As in the first embodiment, when the lock member 18 is in the locked state P, each contact portion 31 approaches and contacts the inner surface 5a of the corresponding top plate portion 5 of the lower rail 1 and the gap G between the inner surface 5a and the contact portion 31 is eliminated (the approaching state SP). In other words, in the locked state P, each contact portion 31 is pressed against both the inner surface 5a and the inner surface 4a.

Like the first embodiment, when the lock member 18 is in the locked state Q, each contact portion 31 is separated from the inner surface 5a of the corresponding top plate portion 5 and the gap G is formed between the inner surface 5a and the contact portion 31. Meanwhile, the contact portion 31 is separated also from the inner surface 4a of the corresponding side plate portion 4 and a gap G is formed between the inner surface 4a and the contact portion 31 (a separated state SQ). In other words, in the unlocked state Q, each contact portion 31 is separated from both the inner surface 5a and the inner surface 4a of the lower rail 1 at the same time. This permits the upper rail 2 to move with respect to the lower rail 1 in the front-rear direction X.

Accordingly, the first and second embodiments have the advantages described below.

(1) When the lock member 18 is in the unlocked state Q, the front and rear movable portions 29 are each held in the separated state SQ through the corresponding interlocking means, as illustrated in FIG. 2B. In this state, referring to FIGS. 4B and 6A, the gap G is formed between each contact portion 31 of each movable portion 29 and the inner surface 5a of the corresponding top plate portion 5. This decreases resistance to movement of the upper rail 2 with respect to the lower rail 1, even if there is an error in dimensional accuracy between the lower rail 1 and the upper rail 2. As a result, smooth movement of the upper rail 2 is allowed.

(2) In contrast, when the lock member 18 is in the locked state P, the front and rear movable portions 29 are each held in the approaching state SP through the corresponding interlocking means. In this state, as illustrated in FIGS. 4A and 5A, the gap G between each contact portion 31 of each movable portion 29 and the inner surface 5a of the corresponding top plate portion 5 is eliminated. This prevents rattling of the upper rail 2 with respect to the lower rail 1, even if there is an error in dimensional accuracy between the lower rail 1 and the upper rail 2.

(3) The interlocking means is configured by the levers 22 formed in each upper rail 2, the sliders 26 connected to the levers 22, and the guides 16 arranged in the lower portion of the upper rail 2. The interlocking means are simply configured to switch the movable portions 29 to the separated state SQ when the lock member 18 is in the unlocked state Q and to the approaching state SP when the lock member 18 is in the locked state P. The interlocking means may be referred to herein as an interlocking mechanism.

(4) In the first embodiment, each contact portion 31 of each movable portion 29 is brought into contact with or separated from the inner surface 5a of the corresponding top plate portion 5 at the front and rear ends of each upper rail 2. This evenly reduces resistance to movement of the upper rail 2 in the unlocked state Q and evenly prevents rattling of the upper rail 2 in the locked state P. In this case, the restriction surface 16a of each guide 16 may be shaped to set the movement directions of each contact portion 31 with respect to the inner surface 5a of the corresponding top plate portion 5 to the up-down direction Z.

(5) In the second embodiment, not only at the front and rear ends of each upper rail 2 but also at the left and right sides of the upper rail 2, the contact portions 31 of each movable portion 29 are brought into contact with or separated from the inner surfaces 4a of the corresponding side plate portions 4. This configuration also effectively decreases resistance to movement of the upper rail 2 in the unlocked state Q and effectively prevents rattling of the upper rail 2 in the locked state P. Further, in this case, the restriction surface 16b of each guide 16 may be shaped to set the movement directions of each contact portion 31 with respect to the inner surface 4a of the corresponding side plate portion 4 to the left-right direction Y.

The first and second embodiments may be modified to the forms described below.

In the illustrated embodiments, the gap G between each contact portion 31 of each movable portion 29 and the inner surface 5a of the corresponding top plate portion 5 is eliminated when the lock member 18 is in the locked state P. However, the gap G does not necessarily have to be eliminated as long as the gap G is small in size compared to the gap G at the time when the lock member 18 is in the unlocked state Q and does not influence rattling of the upper rail 2 with respect to the lower rail 1.

In the illustrated embodiment, the interlocking means for transmitting movement of each lock member 18 as movement of the corresponding movable portions 29 may be any suitable mechanism other than the link mechanism and cam mechanism formed by the levers 22, the sliders 26, and the guides 16.

Each of the illustrated embodiments includes the two movable portions 29, the two levers 22, the two sliders 26, and the two guides 16, which are arranged at the corresponding front and rear sides of each upper rail 2. However, only one movable portion 29 may be employed and arranged below each lock member 18.

The invention claimed is:
1. A seat slide device comprising:
a lower rail fixed to a floor;
an upper rail fixed to a seat and supported to be movable with respect to the lower rail;
a plurality of lock portions formed in the lower rail and arranged in a movement direction of the upper rail;
a lock member attached to the upper rail, wherein the seat slide device is switchable between a locked state, in which the lock member is engaged with the lock portions to restrict movement of the upper rail with respect to the lower rail, and an unlocked state, in which the lock member is separated from the lock portions to permit the movement of the upper rail with respect to the lower rail;
a movable portion selectively approaching and separating from a top plate portion of the lower rail; and
an interlocking mechanism for transmitting movement of the lock member as movement of the movable portion, the interlocking mechanism includes:
a slider connected to the upper rail so that the slider reciprocates in a longitudinal direction of the upper rail, the movable portion being provided in the slider; and
a guide formed in the upper rail, the guide causing the movable portion to separate from the top plate portion or approach the top plate portion through movement of the slider,
wherein the interlocking mechanism moves by transmitting movement of the lock member as the movement of the slider drives the movable portion along edges of said guide, and
wherein in the unlocked state, the movable portion becomes separated from the top plate portion, in the locked state, the movable portion approaches the top plate portion to decrease a gap between the movable portion and top plate portion compared to the gap in the unlocked state.

2. The seat slide device according to claim 1, wherein the guide has a restriction surface for moving the movable portion in a direction transverse to the movement direction of the upper rail.

3. The seat slide device according to claim 2, wherein the interlocking mechanism is located on opposite sides of the upper rail.

4. The seat slide device according to claim 3, wherein
the upper rail includes a pair of guide plate portions, wherein the guide plate portions are arranged on opposite sides of the upper rail,
a sliding groove for receiving the slider in a reciprocal manner is formed between the two guide plate portions,
the movable portion is one of two movable portions provided at front and rear ends of the slider,
each of the movable portions includes a pair of contact portions formed at left and right sides of the slider,
the guide is one of two guides arranged at left and right sides of the sliding groove,
each guide has a restriction surface for moving the corresponding one of the contact portions, and
the guiding plate portion is an inner wall surface of a groove through which the corresponding contact portion passes when the upper rail moves, the guiding plate portion being one of two guiding plate portions arranged at opposite sides of the lower rail.

5. The seat slide device according to claim 4, wherein
the interlocking mechanism includes a lever provided in the upper rail, the lever moving while being interlocked with the lock member supported rotationally with respect to the upper rail, and
the interlocking mechanism transmits rotation of the lock member to the slider through the levers.

* * * * *